Feb. 3, 1942.  H. D. FOWLER  2,271,763
DUPLEX AILERON CONTROL
Filed Aug. 13, 1940   5 Sheets-Sheet 1

Inventor
HARLAN D. FOWLER,
By Herbert W. Huebner
Attorney

Feb. 3, 1942.   H. D. FOWLER   2,271,763
DUPLEX AILERON CONTROL
Filed Aug. 13, 1940   5 Sheets-Sheet 2
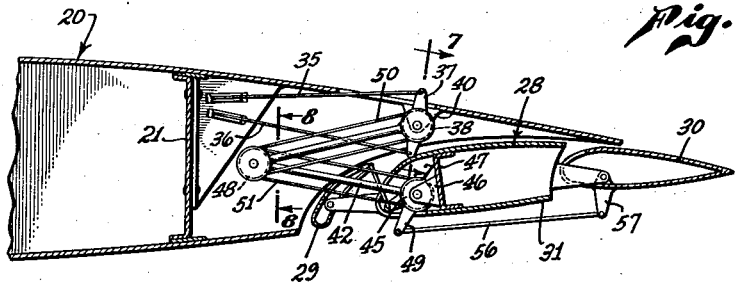
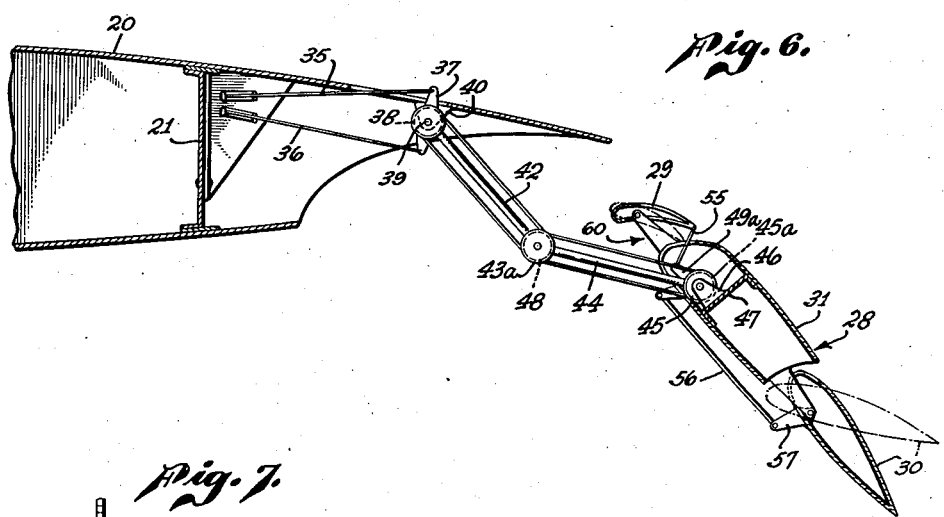
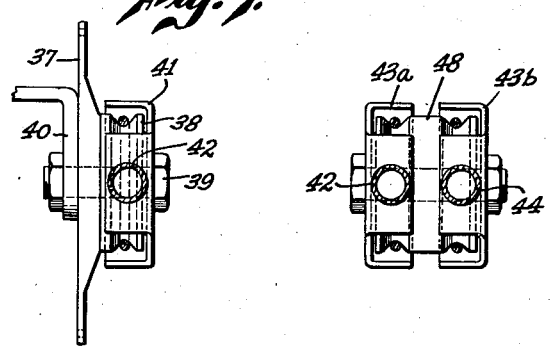
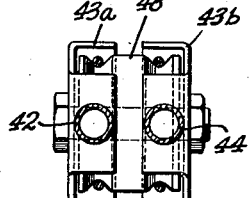
Inventor
HARLAN D. FOWLER,
By
Attorney Feb. 3, 1942.   H. D. FOWLER   2,271,763
DUPLEX AILERON CONTROL
Filed Aug. 13, 1940    5 Sheets-Sheet 3

Inventor
HARLAN D. FOWLER,
By
Attorney

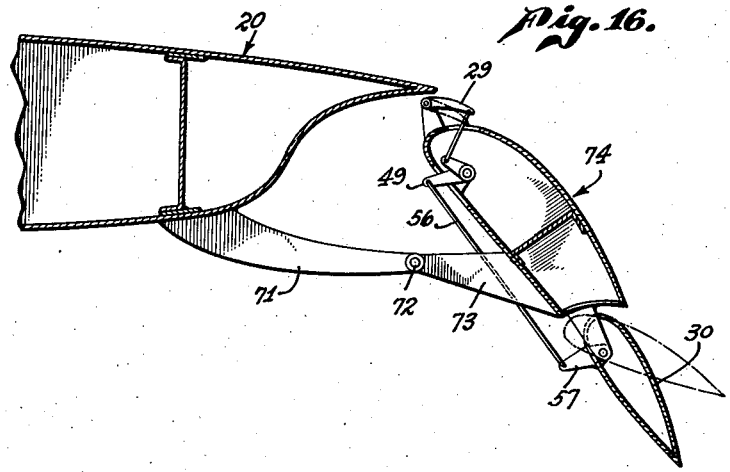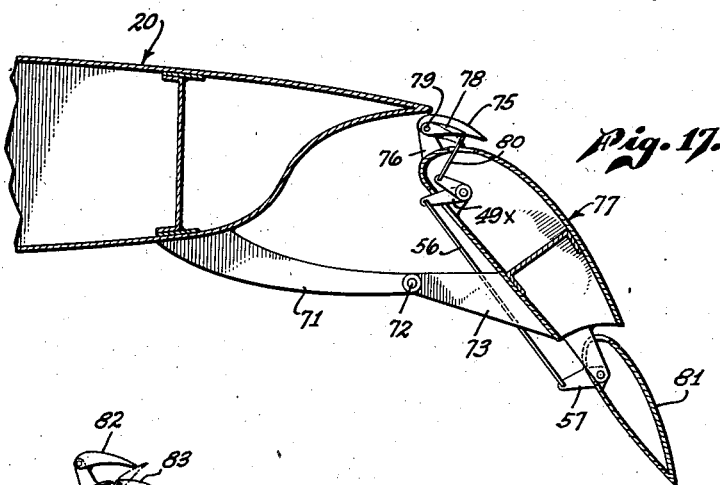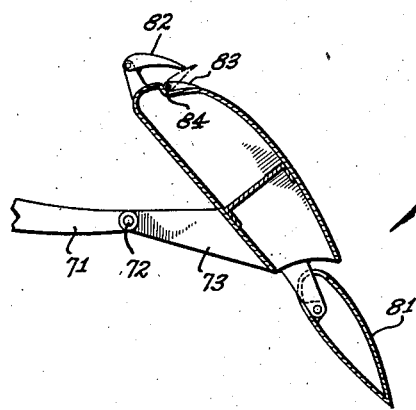

Feb. 3, 1942.   H. D. FOWLER   2,271,763
DUPLEX AILERON CONTROL
Filed Aug. 13, 1940   5 Sheets-Sheet 4

Inventor
HARLAN D. FOWLER,
By Robert A. Hubner
Attorney

Patented Feb. 3, 1942

2,271,763

UNITED STATES PATENT OFFICE 2,271,763

DUPLEX AILERON CONTROL

Harlan D. Fowler, San Diego, Calif.

Application August 13, 1940, Serial No. 352,386

13 Claims. (Cl. 244—90)

My invention relates to aircraft embodying one or more airfoils or wings having cambered surfaces on which are employed extensible or variable area type of flaps which are generally movable rearwardly and downwardly and ultimately forming a gap between the trailing edge of the wing and the leading edge of the flap, the flaps being used to reduce the landing speed as well as to reduce the take-off run.

The primary purpose of the present invention is to provide improved means for regulating the bank and turn of an airplane embodying flaps of the type mentioned. The conventional way for doing this is by means of aileron surfaces disposed near the left and right hand tips of the wing. To execute a banking turn to the right the left aileron is deflected downward and the right aileron is deflected upward, causing increased upward lift on the left side and decreased lift on the right side. The ailerons are interconnected and their angular deflections are sometimes equally plus and minus, as for example down 20° and up 20°, and sometimes differentially as for example down 10° and up 30°. This method is dependable and powerful, but previous to my present invention has been subject to the limitation that the high lift device and the aileron must occupy separate sections on the trailing portions of the wing.

In order to obtain the fullest benefit from the type of high lift device described such as the extensible or variable area flap, it is desirable to use it over the entire span, or from tip to tip of the wing. However, in cases where such a flap extends across the entire span of the wing and is disposed within a recess in the lower rear side of the wing, it is difficult, if not impossible, to deflect the conventionally mounted aileron downward because of the interference from the flap.

It is therefore another broad object of my invention to provide in conjunction with a wing and full span flap of the character described, novel and powerful lateral control surface means under the control of the pilot for banking and turning the aircraft whether the flap is completely retracted, or partially or fully extended rearwardly. Moreover, the arrangement and construction eliminates any danger from binding or locking of the control surfaces arising from severe accumulation of sleet, rime, or solid ice usually encountered during inclement weather.

A further important object to be obtained by my improved means for lateral control for a wing and full span flap is to overcome the lack of adequate rolling moment control when the flap is fully extended. When the flap is fully extended to its ideal position for the attainment of its maximum lift capacity or fully efficient the stalling speed of the airplane is at its minimum. Experience has demonstrated that when such slow speeds are in the range of 25 to 40 miles per hour the usual type of lateral control becomes very weak or practically ineffective, and is due to extremely low air pressure acting on such control surfaces. This condition is particularly serious because it is highly desirable to retain absolute lateral control when attempting to land or when accidentally stalling the airplane. Similar conditions may be encountered in the case of a very high wing loading exceeding 50 pounds per square foot.

The basic principle underlying my improved means for obtaining lateral control lies in taking advantage of certain aerodynamic properties of the flap in which is incorporated a slat or deflector plate at or near its leading edge and thereby forming a slot. Certain wind tunnel tests have shown that the maximum lift obtainable by such an arrangement occurs when the flap has been deflected by at least 10° more than required for the flap without the nose slot. This is illustrated in Figures 1, 2 and 3. When the flap diagrammatically shown in Figure 2, with the slat closed, is deflected 40° from its normally closed position and the leading edge of the flap is spaced vertically a short distance from the trailing edge of the main wing, its maximum lift coefficient of 2.95 is attained, but when this flap is deflected 50°, then the entire lift curve decreases rapidly with a maximum value of 2.45. However, by opening the slat to form the slot in the 50° deflected flap the entire lift curve increases and its maximum is 3.15. Therefore when the nose slat is caused to be closed by mechanical means, the loss of lift is sudden and of considerable magnitude, as represented by the shaded area. If this loss of lift is introduced in the form of a lateral control device on, for example, the right side of a full span flap wing, the opposite or left side having the nose slat open, then by virtue of losing that lift the right wing drops and the airplane turns into a right banking turn. Figure 3 diagrammatically illustrates another type of slotted flap which develops similar aerodynamic characteristics when a slat is disposed above the nose of the flap.

Thus a substitute for decreasing the lift on one side of the wing with the flap fully extended is to close the nose slat on the flap and deflect upward the aileron mounted on the flap, the aileron on the opposite side of the wing being deflected downward. Due to the fact that the entire wing may be operating near its stall lift, the downward moving aileron can exert only a very small, if any, uplift. Hence the principal source of lateral control, with flaps extended, is to lose lift rapidly and potentially on one side by closing the nose slat of the flap and thus eliminating the slot.

It is therefore a more specific object of my invention to provide in connection with a cambered wing a full span extensible or variable area flap having associated with it a nose slat at its leading edge and an aileron at its trailing edge, and mechanical means within the control of the pilot to maintain the slat open and deflect the aileron downwardly, and to close the slat and deflect the aileron upwardly. Such control means may be selective for the left and right wing sections of an aircraft, or may be arranged for simultaneous differential control action. When the flap is entirely closed or only partially extended, the ailerons function normally when deflected upwardly and downwardly, alternately. The simultaneous movements of the nose slats take place, but are ineffective when occurring within the recess of the trailing portion of the main wing in which the flap is faired.

From the preceding description it should be apparent that with the flap sufficiently extended, the use of the nose slats alone can be used for effective lateral control of the airplane. This use may be augmented by the ailerons, and the latter are adequate without the slats when the flap is closed or partially closed for normal flight.

Other objects and advantages incidental to the foregoing, and also arising from the details of construction hereinafter described, will become apparent from a full consideration of the specification and drawings.

In the drawings:

Figure 5 is an enlarged fragmentary cross-section taken on the line 5—5 of Figure 4 showing the extensible flap in closed position.

Figure 6 is a view similar to Figure 5 showing the flap in an extended position.

Figure 7 is an enlarged fragmentary detail taken on the line 7—7 of Figure 5.

Figure 8 is another enlarged fragmentary detail taken on the line 8—8 of Figure 5.

Figure 16 is a view similar to Figure 13 showing the flap in extended position.

Figure 17 is a view of the same general character as Figure 16 illustrating an alternative construction in which an auxiliary slat is employed to close the nose slot.

Figure 18 is a fragmentary sectional view generally similar to the flap illustration of Figure 17 but showing another alternative auxiliary slat means for closing the nose slot.

Figure 1:
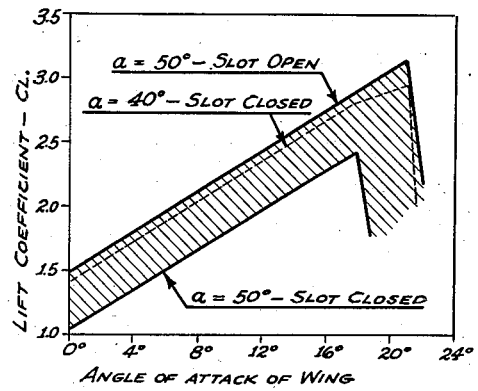
Figure 1 illustrates aerodynamic lift curves obtained from wind tunnel investigation.
Figures 2, 3:
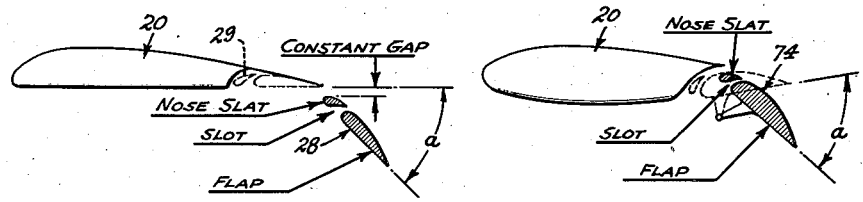
Figure 2 is a diagrammatic view representing a cross section of a wing with an extensible type of flap.
Figure 3 is a similar diagrammatic view illustrating another form of wing and flap.
Figure 4:
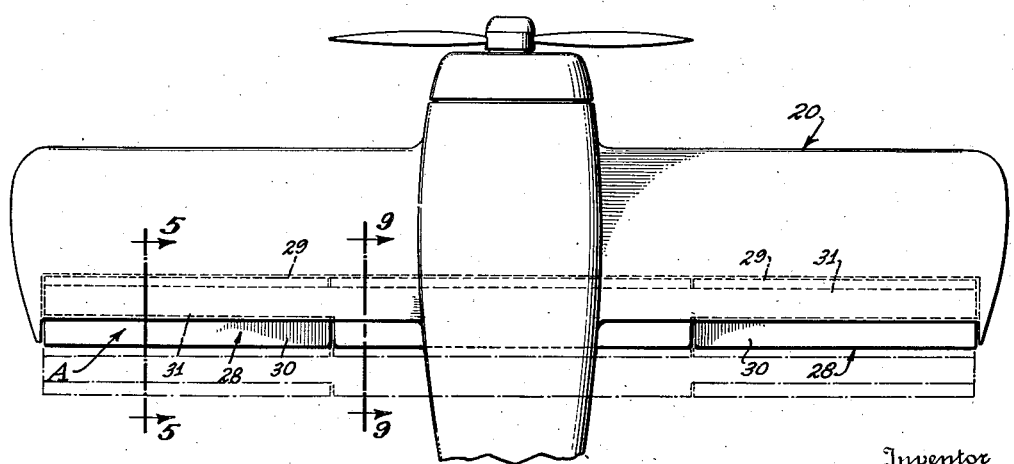
Figure 4 is a top plan view of a wing embodying my invention, shown in relation to the fuselage of a low wing monoplane.
Figure 9:
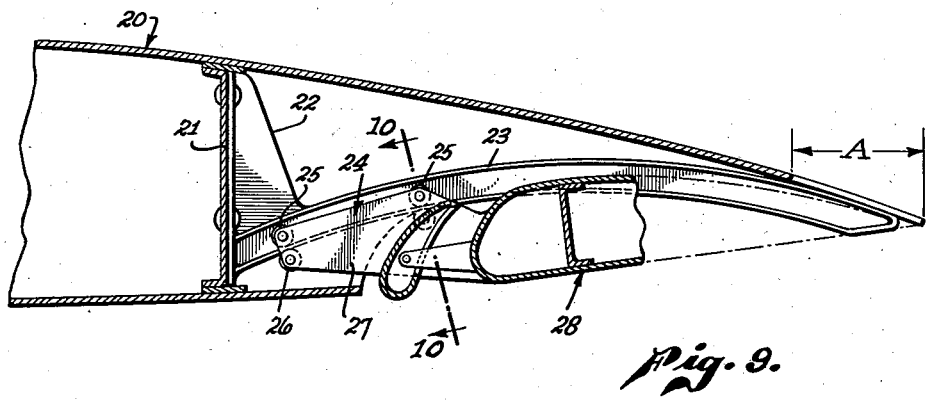
Figure 9 is an enlarged fragmentary cross-section taken on the line 9—9 of Figure 4 to illustrate one means for mounting the extensible flap on the main wing whereby the flap may have relative movement thereto.
Figure 10:
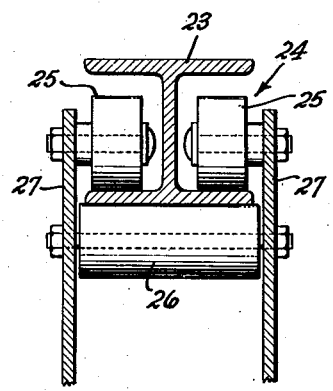
Figure 10 is an enlarged fragmentary cross-section taken on the line 10—10 of Figure 9. The principal subject matter of Figures 9 and 10 is omitted from the other views for the sake of clarity.

My invention is adapted to be applied to a rectangular or to a tapered wing employing any approved type of construction. For the purpose of illustration I have shown it applied to a main wing 20, including a rear spar 21. Suitably mounted on the rear spar is a bracket 22 (see Figures 9 and 10) by means of which a curved I-beam track 23 is securely mounted on the inside of the trailing portion of the wing. A trolley 24 comprising two pairs of upper rollers 25 and two lower rollers 26 movably support a pair of brackets 27 upon which are mounted the flap 28. Suitable means, not illustrated, for controlling and maintaining the rearward position of the trolleys and consequently the position of the flap are provided. One form of means for controlling the position of the trolleys is continuous cables connected thereto leading to the pilot controls. The means for mounting and controlling the position of the flap is not a part of the present invention and the brief description given is believed sufficient.

The flap 28 is normally faired under the trailing portion of the main wing 20, as shown in Figure 5, and may be extended partially, or completely as illustrated in Figure 6.

In the form I have chosen for illustration the flap 28 comprises nose slats 29, ailerons 30, and the intermediate flap section 31. The slats 29 are pivotally mounted on brackets which are secured to the leading edge of the intermediate section 31 of the flap, and the ailerons are pivotally mounted on brackets mounted at the trailing edge of the intermediate section of the flap.

In general, the chord of each aileron on the flap may be from 8 to 12 per cent of the true wing chord and preferably from one half to two-thirds of the wing semi-span, deflecting differentially through a total of not less than 60°. The nose slat chord is dependent upon its design relation to the flap, and its span should be at least as great as that of the aileron, the nose slat over the remaining span being fixed to the flap. The choice within these proportions will depend upon the purpose of the airplane and the construction of the wing. The flap as such preferably extends substantially the full wing span.

The recessed portion of the wing in which the flap is faired is not necessarily covered on the lower side, the ribs being exposed to view when the flap is extended. The trailing surface of the wing has a cut-back "A" to accommodate upward deflection of each aileron when the flap is fully retracted, and will also normally occur along the wing span where ailerons are not used.

For the purpose of controlling the positions of each slat and aileron with respect to the intermediate section 31 of the flap I provide the following mechanism:

Referring to Figures 5, 6, 7 and 8, cables 35 and 36 leading from the pilot's control are secured to a bell crank 37. The bell crank is fixed to a drum 38, the bell crank and drum being rotatably mounted on a bolt 39, the entire unit being supported by a bracket 40 secured to the wing 20. A housing 41 is independently mounted on the bolt 39 enclosing the drum 38, the housing having suitable openings for clearance of cables to be described. Rigidly fixed to the housing 41 is a shaft 42 extending to a housing 43a which forms an elbow, and a similar shaft 44 extends between a housing 43b and a fourth housing 45, the latter being rotatably mounted by means of a bolt similar to the bolt 39, and a bracket 46 upon the leading spar 47 of the intermediate section 31 of the flap. A double drum 48 is rotatably mounted within the housings 43a and 43b and a drum 45a generally similar to the drum 38 is rotatably mounted in the housing 45. The elbow formed by the housings 43a and 43b and drum 48 provides for a fixed cable length between the drum 38 carried by the main wing and the corresponding drum carried by the flap, whether the flap is in fully closed position or partly or fully extended. A bell crank 49 is fixed to the drum in the housing 45.

A cable 50 extends from the drum 38, to which it is anchored, to the drum 48 to which it is anchored, and a cable 51 also anchored to the drum 48 extends between that drum and the drum within the housing 45, to which the cable is also anchored.

It is thus possible to transmit a pilot's control force from the wing to the flap no matter what extended position the flap may assume, without loss of motion. This force is utilized for controlling the slat and the aileron by means next described.

A connecting link 55 extends between the arm 49a of the bell crank 49 and the slat 29. An aileron control link 56 connects the bell crank 49 with an arm 57 on the aileron 30. Thus, clockwise rotation of the bell crank 49 resulting from movement of the cables 35 and 36 results in simultaneously increasing slightly the opening of the slat 29 (which when open forms a slot 60), and a deflection downward of the aileron 30. Counter-clockwise rotation of the bell crank 49 results in the simultaneous closing of the slat 29 as indicated in dotted lines in Figure 6 and an upward deflection of the aileron also indicated by dotted lines. It is therefore apparent that the aileron and nose slat are actuated simultaneously, the nose slat being completely closed when the aileron is fully deflected upward, but the linkage may be so arranged that the nose slat is fully opened when the aileron is deflected downward, and substantially opened when the aileron is neutral. As preferably arranged, the nose slat is almost fully open when the aileron is in neutral position. If desired the bell crank 49 may be so positioned that lost motion of the arm 49a is utilized to maintain the slot 60 fully open whether the aileron is in neutral position or is deflected downwardly.

Figure 11:
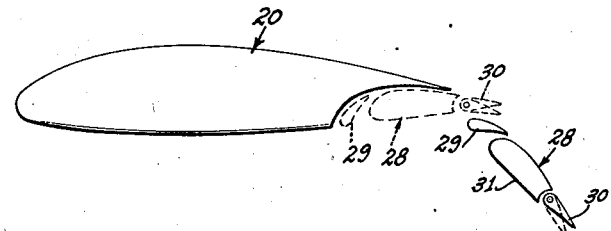
Figure 11 is a diagrammatic view representing a cross-section taken on the line 5—5 of Figure 4, with the flap extended and the nose slat and aileron in given positions.
Figure 12:
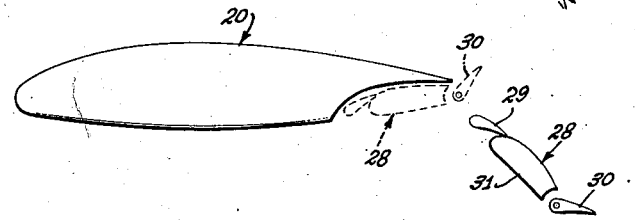
Figure 12 is a view similar to Figure 11 showing the nose slat and aileron in different positions.
Figure 13:
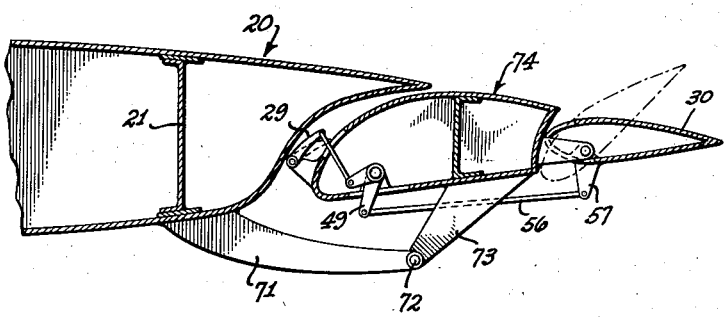
Figure 13 is a view generally similar to Figure 5 illustrating a modified form of my invention.
Figure 14:
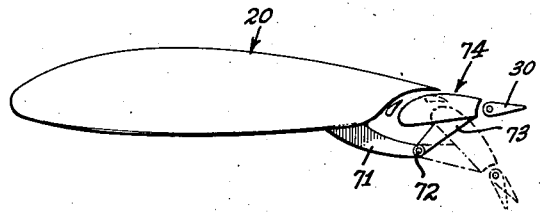
Figures 14 and 15 are diagrammatic views representing cross-sections generally similar to Figures 11 and 12 but of the modified form of my invention shown primarily in Figure 13.
Figure 15:
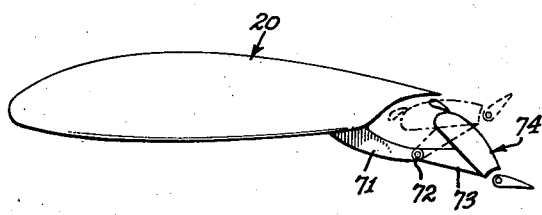

The relative movement and positions of the main wing, the nose slat, the intermediate section of the flap, and the aileron, are illustrated in the diagrammatic views, Figures 11 and 12.

In the modified form of my invention illustrated in Figures 13 to 16 inclusive, I provide on the main wing 20 extending brackets 71 to which are articulately mounted at 72, secondary brackets 73 upon which are mounted the flap 74. In this form of the invention the nose slats and ailerons are mounted on the intermediate section of the flap in the same manner as illustrated in Figures 5 and 6, and similar control means are employed as in the preferred form of my invention. The backward and downward movement of the flap is controlled and maintained by any suitable means such, for example, as cables leading to the pilot's controls. The movement may not be so large, however, as provided by the flap mounting illustrated in Figures 9 and 10 and contemplated in Figures 5 and 6.

In the modified form of my invention shown in Figure 17, I provide a fixed slat 75 mounted on bracket 76 at the leading edge of the intermediate section 77 of the flap, and an auxiliary slat 78 pivotally mounted at 79 on the bracket 76, the auxiliary slat 78 being normally faired underneath the fixed slat 75. The control link 80 is connected to the pivoted auxiliary slat 78 and is closed by rotation of the bell crank 49x in a counterclockwise direction which simultaneously deflects the aileron 81 upwardly.

In Figure 18 I provide a fixed slat 82 and a separate slat 83 which is pivotally mounted in the leading edge of the intermediate section of the flap at 84. Control linkage generally similar to that illustrated in Figure 17 may be employed to effect a simultaneous closing of the slat with upward deflection of the aileron, and opening of the slat 83 upon downward deflection of the aileron.

When I speak of a wing with a flap the full wing span I include as an equivalent a wing in two sections divided by the fuselage, each section being in effect a portion of the wing. My invention is applicable to this type of wing structure, and is equally applicable to any wing construction, and has certain advantages, as pointed out, even where the flap is not full span or semi-span.

Having thus described my invention what I claim as new and desire to secure by Letters Patent is:

1. An airfoil including a cambered wing comprising a main portion and a trailing portion, a rearwardly extensible flap adapted to be faired under the said trailing portion, said flap including a nose slat at the leading edge of the flap and adapted to be moved relative to said leading edge to open and close a slot, and control means providing for mechanical control of the nose slat when the flap is retracted, partially or fully extended.

2. An airfoil including a cambered wing comprising a main portion and a trailing portion, a rearwardly extensible flap adapted to be faired under the said trailing portion, said flap including nose slats at the leading edge of the flap at opposed outer portions of the flap and adapted to be moved relative to said leading edge to open and close slots, and control means providing for differential mechanical control of the slats when the flap is retracted, partially or fully extended.

3. An airfoil including a cambered wing comprising a main portion and a trailing portion, a rearwardly extensible flap adapted to be faired under the said trailing portion, said flap comprising an intermediate section, a nose slat at the leading edge of the intermediate section adapted to be moved relative to said leading edge to open and close a slot, an aileron pivoted to the rear part of the intermediate section, and control means providing for mechanical control of the nose slat and the aileron.

4. An airfoil including a cambered wing comprising a main portion and a trailing portion, a rearwardly extensible flap adapted to be faired under the said trailing portion, said flap comprising an intermediate section, a nose slat at the leading edge of the intermediate section adapted to be moved relative to said leading edge to open and close a slot, an aileron pivoted to the rear part of the intermediate section, and control means interconnecting said nose slat and said aileron for simultaneous movement.

5. An airfoil including a cambered wing comprising a main portion and a trailing portion, a rearwardly extensible flap adapted to be faired under the trailing portion, said flap comprising an intermediate section, a nose slat pivoted at the leading edge of the intermediate section adapted to be deflected relative to said leading edge to open and close a slot, an aileron pivoted to the rear part of the intermediate section, and control means providing for mechanical control of the nose slat and the aileron.

6. An airfoil including a cambered wing comprising a main portion and a trailing portion, a rearwardly extensible flap substantially the full span of the wing adapted to be faired under said trailing portion, said flap comprising an intermediate section, nose slats at the leading edge of the intermediate section at opposed outer portions of the flap and adapted to be independently moved relative to said leading edge to open and close slots, ailerons independently pivoted to the rear part of the intermediate section at opposed outer portions of the flap, and control means providing for mechanical control of a nose slat and aileron at one of the said opposed outer portions of the flap differentially from the control of the nose slat and aileron at the other of the said outer portions of the flap.

7. A device as defined in claim 6 in which there is a fixed nose slat forming a slot along the leading edge of the inboard portion of the flap between the opposed outer portions thereof.

8. An airfoil including a cambered wing comprising a main portion and a trailing portion, a rearwardly extensible flap adapted to be faired under the said trailing portion, said flap comprising an intermediate section, a nose slat at the leading edge of the intermediate section adapted to be moved relative to said leading edge to open and close a slot, an aileron pivoted to the rear part of the intermediate section, and control means for deflecting said aileron upward simultaneously with the movement of said nose slat closing the slot between the nose slat and the leading edge of the intermediate section, and/or for deflecting the aileron downward simultaneously without substantially closing said slot, said control means including means interconnecting said nose slat and said aileron.

9. An airfoil including a cambered wing consisting of a main portion and a trailing portion, a substantially full span rearwardly extensible flap adapted to be faired under said trailing portion, said flap carrying nose slats each adapted to form a slot adjacent the leading edge thereof, and ailerons pivotally mounted at the rear of said flap, said ailerons normally forming the trailing edge of said cambered wing, in the regions occupied by them, each combination of nose slat and corresponding aileron being separately and independently mounted at opposed outer portions of the flap, and means interconnecting each combination of nose slat and corresponding aileron for simultaneous but opposed movement.

10. The combination of a cambered wing comprising a main portion and a trailing portion, a flap mounted at the trailing portion of said wing and adapted to be extended rearwardly and downwardly therefrom, a nose slat movably supported adjacent the leading edge of said flap and adapted to open and close a slot therebetween, and control means extending from the cambered wing to the flap and adapted to position the nose slat with respect to the leading edge of the flap irrespective of the relative positions of the cambered wing and the flap.

11. The combination of a cambered wing comprising a main portion and a trailing portion, a flap mounted at the trailing portion of said wing and adapted to be extended rearwardly and downwardly therefrom, a nose slat movably supported adjacent the leading edge of said flap and adapted to open and close a slot therebetween, an aileron pivotally mounted at the rear of the flap, control means extending from the cambered wing to the flap including means interconnecting the nose slat and aileron adapted to maintain the slat open when deflecting the aileron downwardly and to close the slat when deflecting the aileron upwardly.

12. The combination of a cambered wing comprising a main portion and a trailing portion, a flap mounted at the trailing portion of said wing and adapted to be extended rearwardly and downwardly therefrom, a nose slat movably supported adjacent the leading edge of said flap and adapted to open and close a slot therebetween, and control means extending from the cambered wing to the flap and adapted to position the nose slat with respect to the leading edge of the flap irrespective of the relative positions of the cambered wing and the flap, said control means comprising a pivotally mounted bell crank carried on the cambered wing, a pivotally mounted bell crank carried on the flap and linked to the slat, rigid members extending from the respective pivotal mountings to a drum forming an elbow, a cable connecting the bell crank on the cambered wing to the elbow drum, and a second cable connecting the elbow drum to the bell crank on the flap, said cables being secured to all said drums.

13. The combination of a cambered wing comprising a main portion and a trailing portion, a flap mounted at the trailing portion of said wing and adapted to be extended rearwardly and downwardly therefrom, a nose slat movably supported adjacent the leading edge of said flap and adapted to open and close a slot therebetween, an aileron pivotally mounted at the rear of the flap, control means extending from the cambered wing to the flap and adapted to maintain the slot open when deflecting the aileron downwardly and to close the slot when deflecting the aileron upwardly, said control means comprising a pivotally mounted bell crank carried on the cambered wing, a pivotally mounted bell crank carried on the flap and linked to said nose slat, rigid members extending from the respective pivotal mountings to a drum forming an elbow, a cable connecting the bell crank on the cambered wing to the elbow drum, and a cable connecting the bell crank on the flaps to the elbow drum, and means interconnecting the slat and aileron.

14. An airfoil including a cambered wing comprising a main portion and a trailing portion, a flap articulately mounted at the trailing portion of said wing, said flap including nose slats at the leading edge of the flap at opposed outer portions of the flap and adapted to be moved relative to said leading edge to open and close slots, and control means providing for differential mechanical control of the slats when the flap is retracted, partially or fully extended.

15. An airfoil including a cambered wing comprising a main portion and a trailing portion, a substantially full span flap articulately mounted at the trailing portion of said wing, said flap comprising an intermediate section, nose slats at the leading edge of the intermediate section at opposed outer portions of the flap and adapted to be independently moved relative to said leading edge to open and close slots, ailerons independently pivoted to the rear part of the intermediate section at opposed outer portions of the flap, and control means providing for mechanical control of a nose slat and aileron at one of the said opposed outer portions of the flap, differentially from the control of the nose slat and aileron at the other of the said outer portions of the flap.

16. A device as defined in claim 15 in which there is a fixed nose slat forming a slot along the leading edge of the inboard portion of the flap between the opposed outer portions thereof.

17. An airfoil including a cambered wing comprising a main portion and a trailing portion, a rearwardly extensible flap adapted to be faired under the said trailing portion, said flap including a nose slat at the leading edge of the flap and adapted to be moved relative to said leading edge to open and close a slot, and control means providing for mechanical control of the nose slat when the flap is partially or fully extended.

18. An airfoil including a cambered wing comprising a main portion and a trailing portion, a rearwardly extensible flap adapted to be faired under the said trailing portion, said flap including nose slats at the leading edge of the flap at opposed outer portions of the flap and adapted to be moved relative to said leading edge to open and close slots, and control means providing for differential mechanical control of the slats when the flap is partially or fully extended.

HARLAN D. FOWLER.